United States Patent
Protter et al.

(10) Patent No.: US 10,395,135 B2
(45) Date of Patent: *Aug. 27, 2019

(54) METHOD AND A SYSTEM FOR DETERMINING RADIATION SOURCES CHARACTERISTICS IN A SCENE BASED ON SHADOWING ANALYSIS

(71) Applicant: Infinity Augmented Reality Israel Ltd., Petach-Tikva (IL)

(72) Inventors: Matan Protter, Kiryat Ono (IL); Motti Kushnir, Kiryat Ono (IL); Felix Goldberg, Haifa (IL)

(73) Assignee: Infinity Augmented Reality Israel Ltd., Petach-Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/901,402

(22) Filed: Feb. 21, 2018

(65) Prior Publication Data

US 2018/0181831 A1    Jun. 28, 2018

Related U.S. Application Data

(63) Continuation of application No. 14/947,584, filed on Nov. 20, 2015, now Pat. No. 9,928,441.

(51) Int. Cl.
*G06K 9/52*    (2006.01)
*G06K 9/46*    (2006.01)
(Continued)

(52) U.S. Cl.
CPC ......... *G06K 9/4661* (2013.01); *G06K 9/4604* (2013.01); *G06K 9/52* (2013.01);
(Continued)

(58) Field of Classification Search
USPC .......................................................... 348/135
See application file for complete search history.

(56) References Cited

U.S. PATENT DOCUMENTS

| 6,858,826 B2 * | 2/2005 | Mueller | G01B 11/00 |
| | | | 250/208.1 |
| 9,600,927 B1 * | 3/2017 | Poursohi | G06T 15/60 |
| (Continued) | | | |

FOREIGN PATENT DOCUMENTS

CN    102422719    4/2012

OTHER PUBLICATIONS

Search Report from Chinese Patent Applicaion No. 2016800792987 dated Apr. 8, 2019 (Translation attached).

*Primary Examiner* — Behrooz M Senfi
(74) *Attorney, Agent, or Firm* — Pearl Cohen Zedek Latzer Baratz LLP

(57) ABSTRACT

A method and a system for analyzing distinct light or radiation sources affecting a scene are provided. The method may include: sensing at least one image of a scene containing surfaces and objects, wherein the scene is illuminated by at least one distinct radiation or source; maintaining a database of the scene which stores approximate positions of at least some of the objects in the scene; identifying at least one candidate silhouette suspected to be cast by the at least one distinct light or radiation source, deriving properties of the at least one distinct light or radiation source, based on the at least one identified silhouette, based on data derived from the database.

18 Claims, 6 Drawing Sheets

(51) Int. Cl.
*G06K 9/62* (2006.01)
*G06T 7/13* (2017.01)
*G06T 7/507* (2017.01)

(52) U.S. Cl.
CPC ......... *G06K 9/6215* (2013.01); *G06K 9/6267* (2013.01); *G06T 7/13* (2017.01); *G06T 7/507* (2017.01)

(56) References Cited

U.S. PATENT DOCUMENTS

| | | | |
|---|---|---|---|
| 9,928,441 B2 * | 3/2018 | Protter | G06K 9/4604 |
| 2004/0212685 A1 | 10/2004 | Smith et al. | |
| 2004/0217260 A1 | 11/2004 | Bernardini et al. | |
| 2005/0200918 A1 | 9/2005 | Muller | |
| 2006/0103728 A1 * | 5/2006 | Ishigami | H04N 1/6027 348/180 |
| 2010/0061623 A1 * | 3/2010 | Yokoi | G01B 11/25 382/154 |
| 2012/0135783 A1 | 5/2012 | Sams | |
| 2013/0335578 A1 * | 12/2013 | Deshpande | H04N 17/00 348/180 |
| 2016/0042531 A1 * | 2/2016 | Nolan | H05B 37/036 348/135 |

\* cited by examiner

METHOD AND A SYSTEM FOR DETERMINING RADIATION SOURCES CHARACTERISTICS IN A SCENE BASED ON SHADOWING ANALYSIS

CROSS-REFERENCE TO RELATED APPLICATIONS

This application is a continuation application of U.S. patent application Ser. No. 14/947,584, filed Nov. 20, 2015, which is incorporated by reference herein in its entirety.

FIELD OF THE INVENTION

The present invention relates generally to the field of image processing, and more particularly to determining wave sources characteristics in a scene based on shadowing analysis carried out on a captured scene.

BACKGROUND OF THE INVENTION

Prior to the background of the invention being set forth, it may be helpful to set forth definitions of certain terms that will be used hereinafter.

The term 'sensing device' as used herein is broadly defined as any combination of one or more sensors that are configured to capture 2D images of a scene. The sensing device may include any type of passive camera or sensor array that can capture radiation and derive an image out of it (examples may include: visible light, IR, ultra sound, radar sensor, and the like).

The term 'shadow' as used herein is broadly defined as a region where radiation from a radiation source (such a light source) is obstructed by an opaque (in the appropriate wavelengths) object. The shadow occupies all of the three-dimensional volume behind an object with light or radiation in front of it. The cross-section of a shadow is a two-dimensional silhouette, or a reverse projection of the object blocking the radiation or light.

The term 'point light source' or 'point radiation source' as used herein is defined as a light source or a radiation source that only casts a simple shadow, called an "umbra".

The term 'non-point light source' or 'extended light source' or 'extended radiation source' as used herein is defined as a radiation or light source whose shadow is divided into the umbra, penumbra and antumbra. The wider the light source or radiation source, the more blurred the shadow becomes. If two penumbras overlap, the shadows appear to attract and merge.

The term 'ambient light' or 'ambient radiation' as used herein is defined as light or radiation that is diffused beyond a certain level so that the outlines of shadows are soft and indistinct or completely non-existent. For example, the lighting of an overcast sky produces few visible shadows.

The term 'distinct light source' or 'distinct radiation source' as used herein in the context of the application is a residual definition of the ambient light discussed above. Generally speaking, a distinct radiation light source will cause objects in a scene to cast shadows having distinct outlines. The outlines of the shadow zones can be found by tracing the rays of light emitted by the outermost regions of the extended light source. If there are multiple light sources, there will be multiple shadows, with overlapping parts darker, and various combinations of brightness levels or even colors.

One of the challenges of computer vision is to detect the presence, and obtain knowledge about distinct radiation or light sources (as opposed to ambient light or ambient radiation) in a scene. The importance of radiation light source analysis is crucial in some use cases such as augmented reality applications in which virtual objects are inserted into the scene and it is essential that the virtual objects will be affected by the lighting conditions as any other real object present in the scene. Additionally, it is also important for enhancing the illusion notion of the viewer, that the virtual objects will cast shadows in a similar way to real objects, given the specified light or radiation conditions.

It would be therefore advantageous to suggest some logic or a flow that will enable a computerized vision system to determine the properties of all distinct light or radiation sources that affect a specific scene that is being captured and analyzed.

SUMMARY OF THE INVENTION

Some embodiments of the present invention include a method and a system for analyzing distinct light sources affecting a scene. The method may include: sensing at least one image of a scene containing surfaces and objects, wherein the scene is illuminated by at least one distinct light or radiation source; maintaining a three-dimensional database of the scene which stores three-dimensional approximate positions of at least some of the objects in the scene; identifying at least one candidate silhouette suspected to be cast by the at least one distinct light or radiation source, deriving properties of the at least one distinct light or radiation source, based on the at least one identified silhouette, based on data derived from the three-dimensional database.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
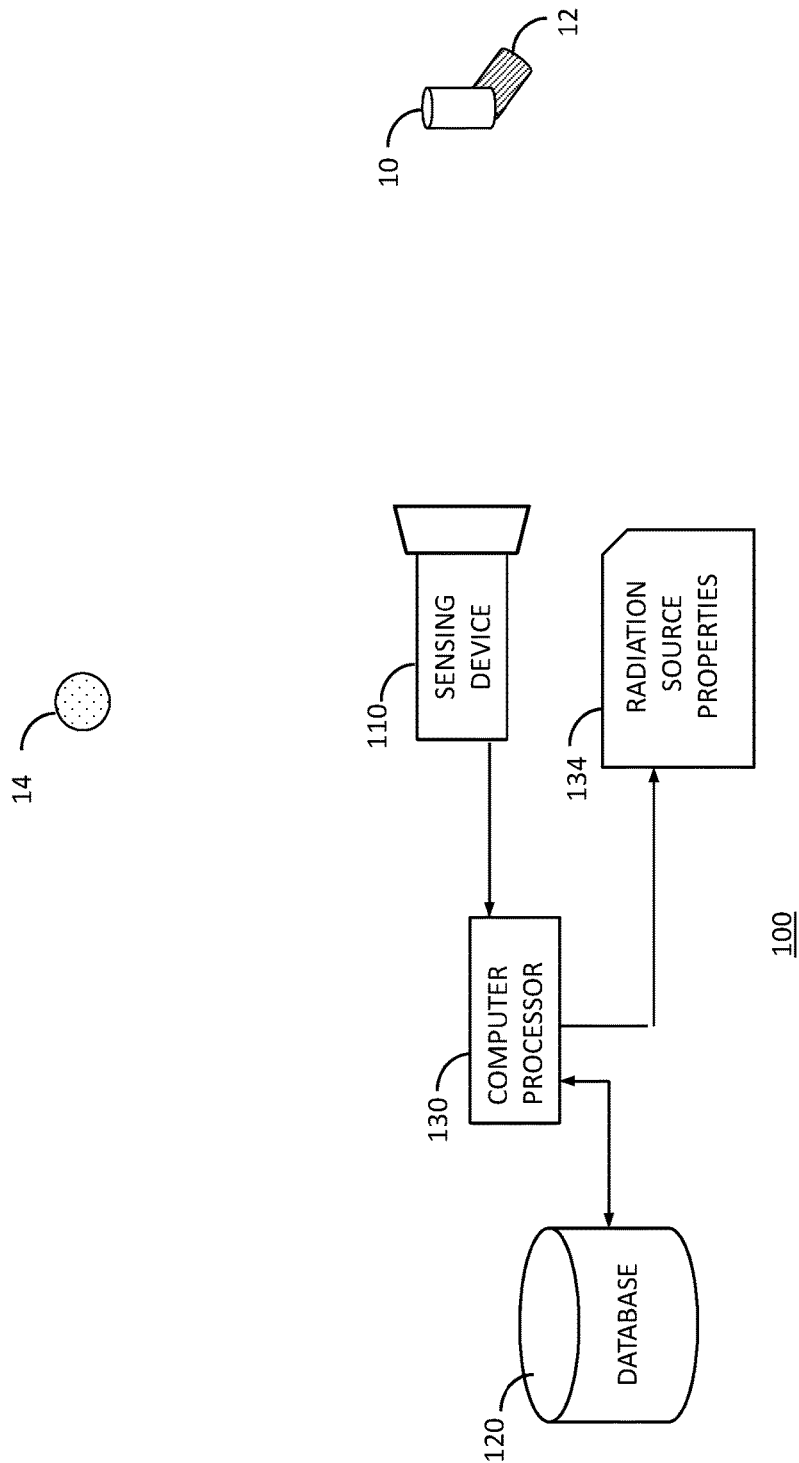
FIG. 1A is a block diagram illustrating a system in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

FIG. 1A is a block diagram illustrating an exemplary architecture on which embodiments of the present invention may be implemented. System 100 may include a sensing device 110 configured to capture a scene that may include objects (e.g. 10). System 100 may further include a storage device 120 configured to maintain a database of the scene which stores positions of at least some of the objects in the scene (including, for example, object 10). System 100 may further include a computer processor 130 configured to identify at least one candidate silhouette 12 suspected to be cast by the at least one distinct light source 14, and derive properties 134 of the at least one distinct light source 14, based on the at least one identified silhouette, based on data derived from the three-dimensional database 120.

According to some embodiments, sensing device may include any type of passive camera or sensor array (either visible light, IR, and the like). The 3D data about the scene stored on 3D database 120 may be partial in nature and may be provided in advance or derived online as the location of the objects may change over time. Alternatively the 3D data may be derived by system 100 for example using moving sensing device 110 with computer processor 130 configured for mapping the scene.

Light or radiation source properties 134 of distinct light or radiation source 14 may include:
  Location in 3D space (in some fixed coordinate system);
  Structure—for example: point light source (bulb); point radiation source (omnidirectional RF antenna) line light source (fluorescent); ambient lighting or radiation (no direct light or radiation source, this is the "average" light or radiation in the scene); Other light or radiation sources can be seen as a combination of points and lines sources;
  Color (wave frequency composition, RF bandwidth);
  Luminance; and
  Directionality (e.g., spotlight, antenna directivity in RF radiation).

According to some embodiments, the properties of all or some of the light source affecting the illumination conditions of the scene can be used for several use cases as detailed below:
  When adding virtual objects to the scene, to render shadows that match the lighting or radiation of the scene;
  When trying to simulate how an environment would look like when the lighting or radiation changes (i.e., interior design).

According to some embodiments, detecting a stationary silhouette (seen in all frames) is carried out by using segmentation techniques. Objects that should have the same color and/or texture are detected. Then places where the overall brightness (or of only some color components) is smaller and gradually increases, are analyzed as an indication of a silhouette.

According to some embodiments, detecting a dynamic silhouette (when some views of the area contain the silhouette and some without) can be carried out by knowing the position and orientation of the camera, and 3D structure of the scene, and recognizing this is the same area with different color/brightness in different points in time (there might be a need to adjust to camera white balance/exposure/gain/and the like). When the change is more than a predefined threshold, this area is a candidate to be a silhouette.

Figure 1B:
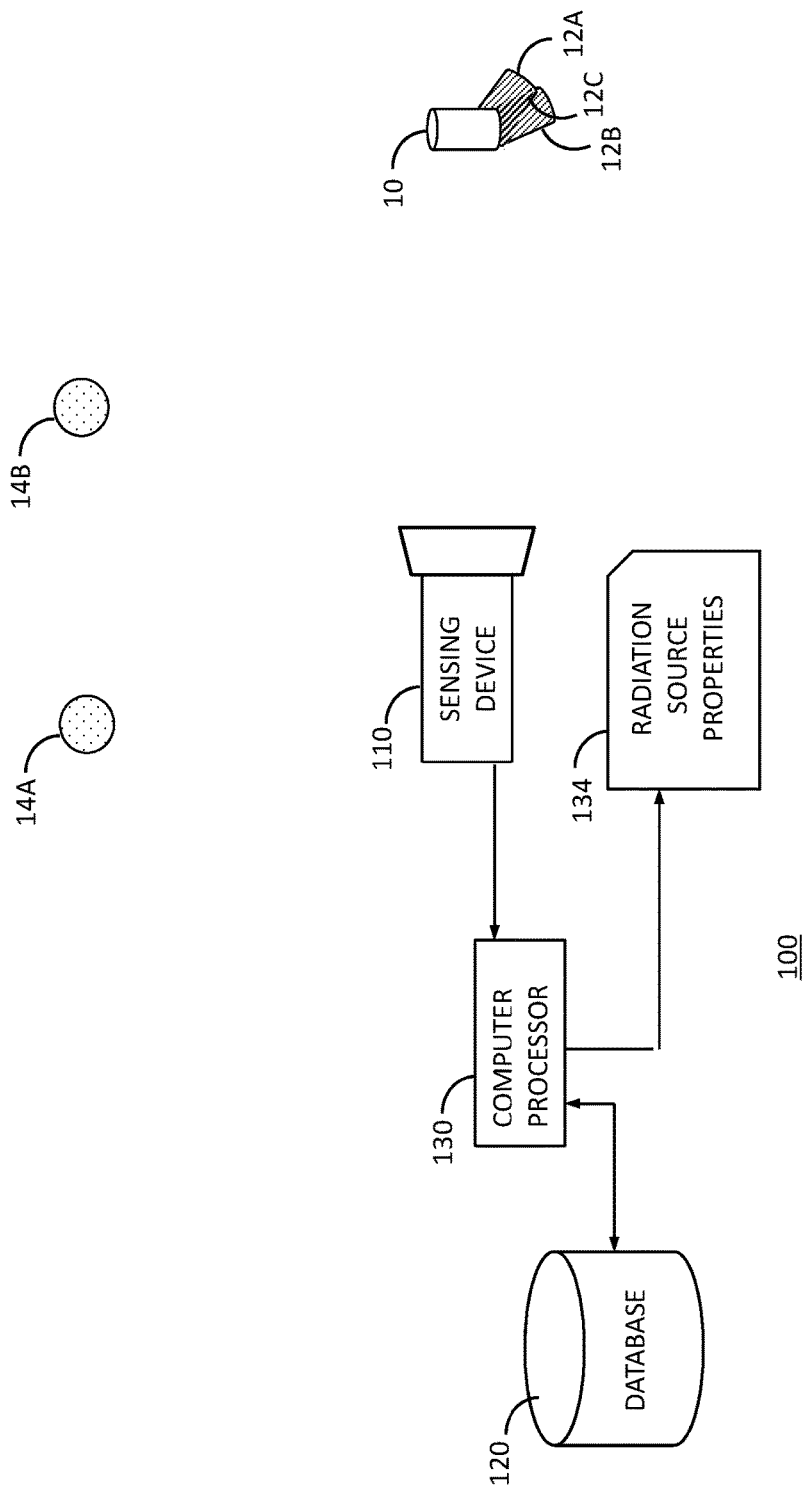
FIG. 1B is a block diagram illustrating a system accordance with other embodiments of the present invention.

FIG. 1B is a block diagram illustrating a system in accordance with other embodiments of the present invention. In addition to all components shown in FIG. 1A, the silhouette here is a compound one constituted of three areas 12A, 12B and 12C being darker than 12A, 12B. This implies two light or radiation sources, for each one, object 10 casts a shadow. In accordance with embodiments of the present invention, the compound silhouette is segmented into the silhouettes generated by a single light source and for each one of them, the properties of the corresponding light or radiation source are derived in a similar way as explained above.

Figure 1C:
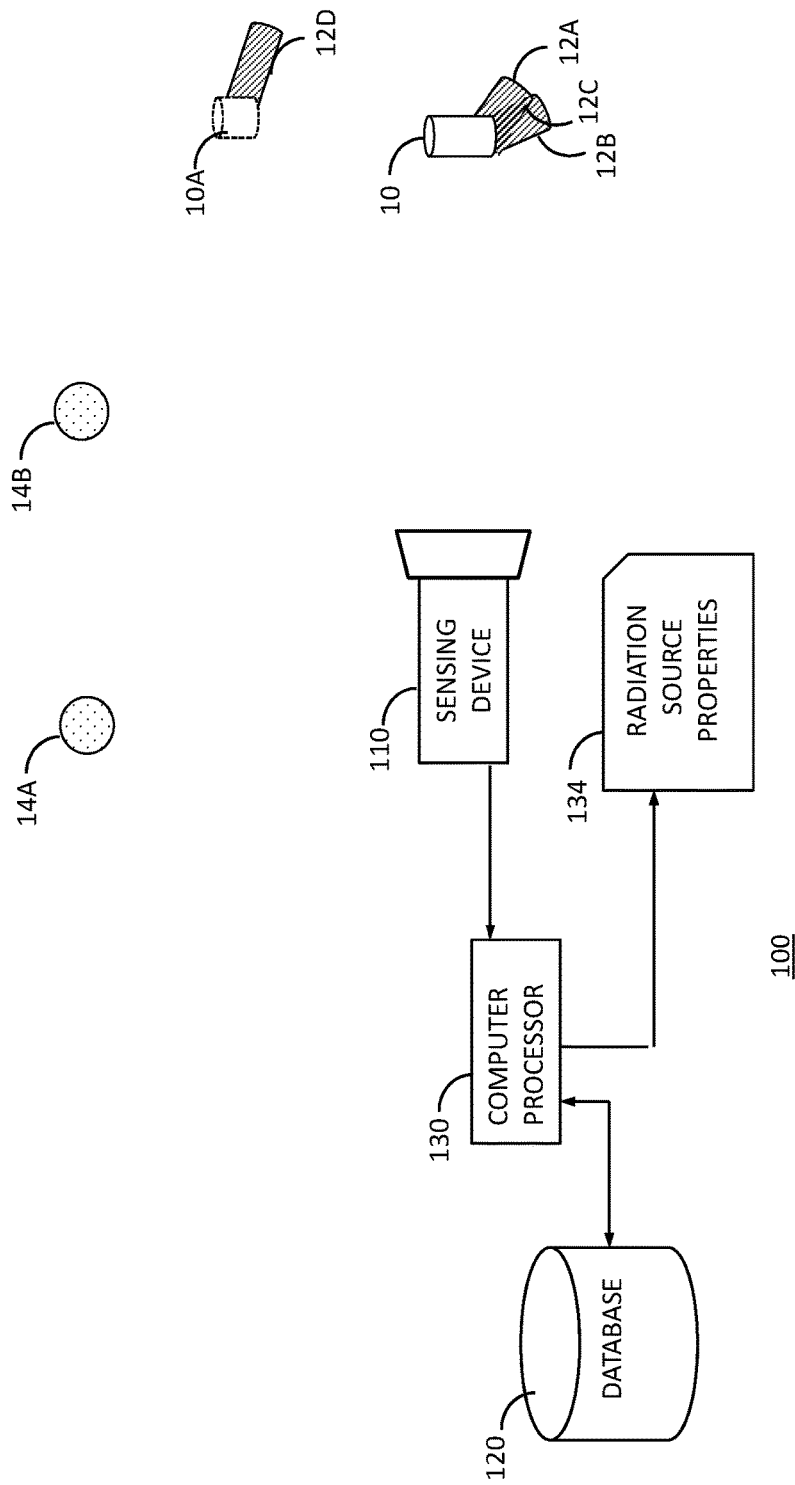
FIG. 1C is a block diagram illustrating a system accordance with yet other embodiments of the present invention.

FIG. 1C is a block diagram illustrating a system in accordance with yet other embodiments of the present invention. Here it is illustrated how once properties of light or radiation sources in the scene have been derived; the newly derived data relating to the light sources can be reiterated and used in order to detect more objects in the scene based on detected shadows. Thus for example, the properties of light or radiation sources 14A and 14B are derived based on shadows 12A-12C and object 10 as explained above. Now, the data relating to light or radiation sources 14A and 14B can be used, together with captured silhouette 12D in order to detect object 10A and its properties. The position of object 10A may be derived based on silhouette 12D cast by light or radiation sources 14A and 14B.

Figure 1D:
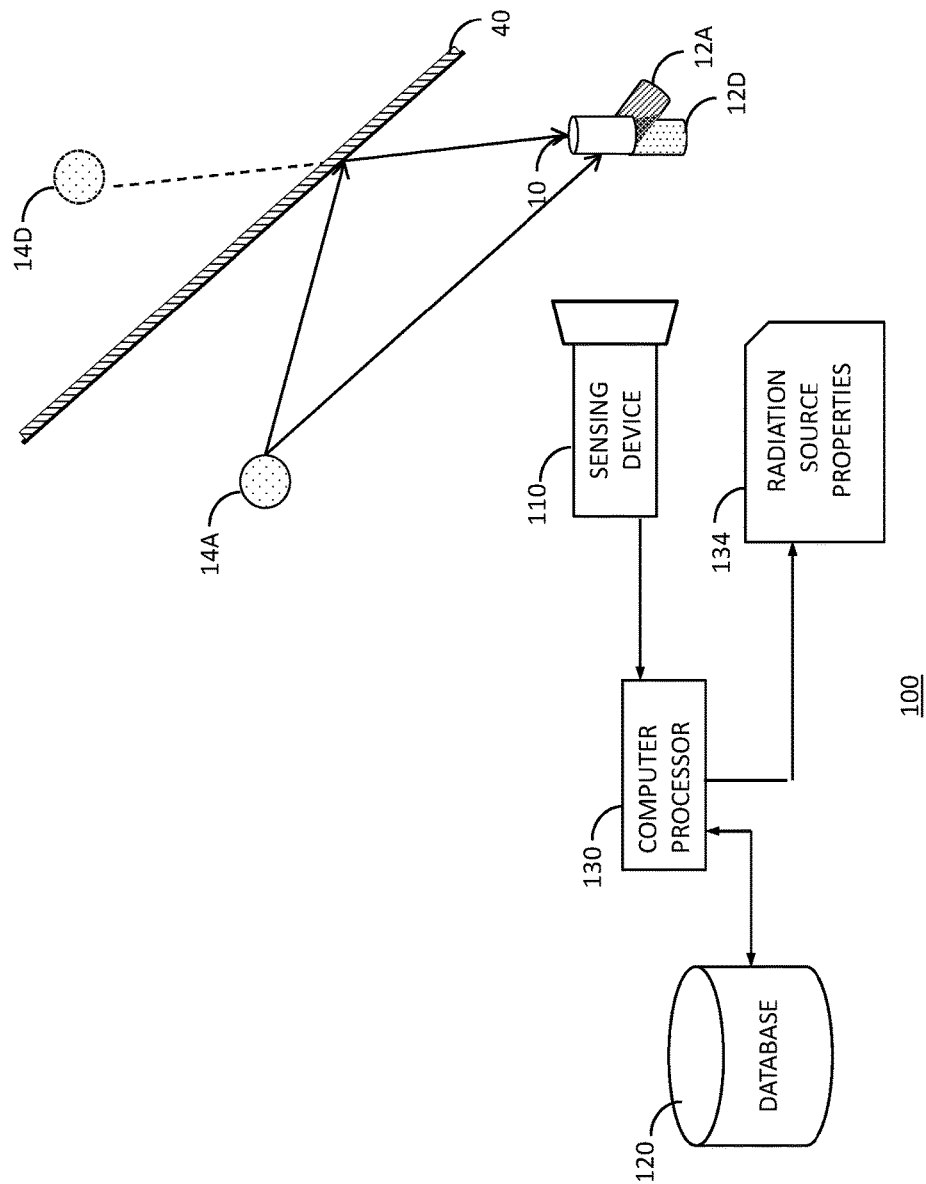
FIG. 1D is a block diagram illustrating a system accordance with yet other embodiments of the present invention.

FIG. 1D is a block diagram illustrating a system in accordance with yet other embodiments of the present invention. The aforementioned scene may further include one or more reflective surfaces such as mirror 40. An image 14D of light or radiation source 14A will also illuminate the scene and serve as a radiation or light source of its own.

In a case that information regarding the reflective surfaces in the scene is provided (position and properties), it would be possible to analyze reflections (light or radiation image source 14D) of the light or radiation real source 14A, and/or analyze the light or radiation rays through the reflective surfaces 40, in order to get more information about light or radiation real source 14A.

For example, for real light or radiation source 14A and one object 10 there is one shadow 12A. In a case that mirror 40 is known (e.g. its equation or mere location and orientation), an auxiliary shadow 12D will also be present. Analyzing both shadows and both real and image light or radiation sources (or back tracing their rays) will provide more insight on the properties of real light source 14A.

Figure 2:
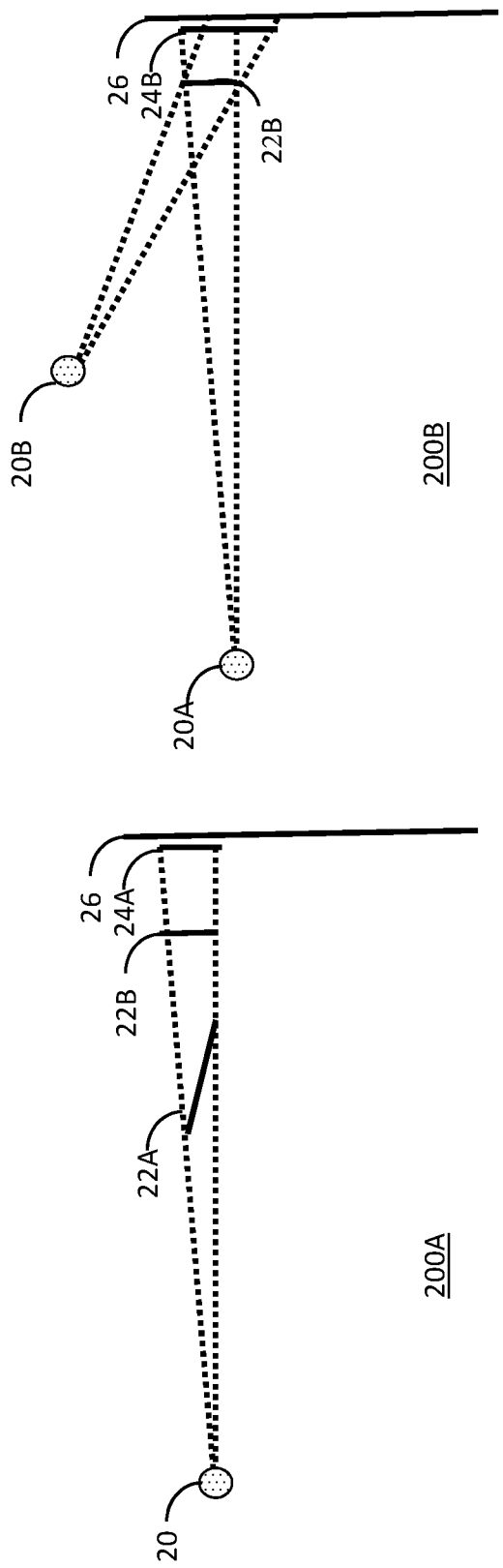
FIG. 2 is a drawing illustrating an aspect of a system in accordance with embodiments of the present invention.

FIG. 2 is a drawing illustrating an aspect of a system in accordance with embodiments of the present invention. In cross section 200A light or radiation source 20 is shown with silhouette 24A cast on a surface 26. Two objects (or more) such as 22A and 22B may be candidates for the silhouette-light source (or radiation source) pair. This ambiguity is solved as illustrated by cross section 200B which shows an additional light or radiation source 20B on top of 20A. Here, the composite (or compound) silhouette 24B together with the two light or radiation sources will help identify object 22B as the only one.

Figure 3:
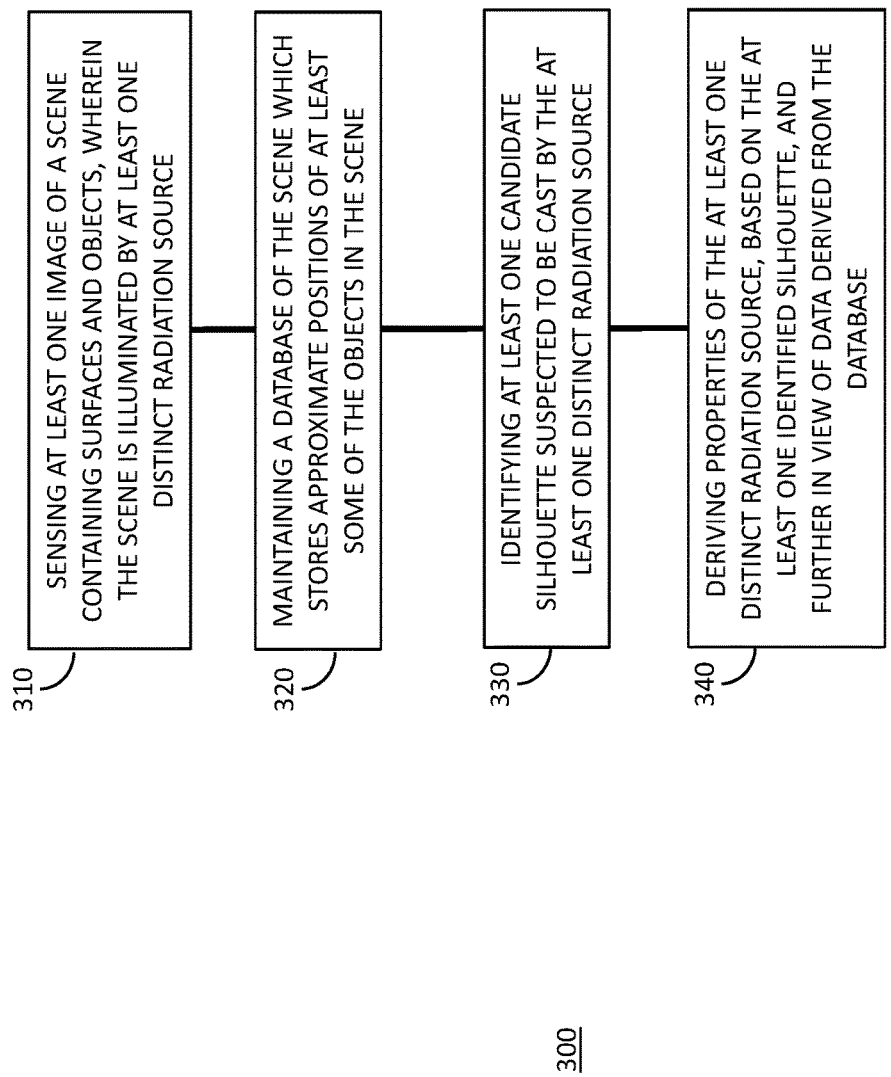
FIG. 3 is a high level flowchart illustrating non-limiting exemplary method in accordance with embodiments of the present invention.

FIG. 3 is a high level flowchart illustrating a method 300 for method identifying light or radiation sources affecting a scene, based on an analysis of silhouettes present in the scene. Method 300 may include the step of: sensing at least one image of a scene containing surfaces and objects, wherein the scene is illuminated by at least one distinct light or radiation source 310; maintaining a database of the scene which stores approximate positions of at least some of the objects in the scene 320; identifying at least one candidate silhouette suspected to be cast by the at least one distinct light or radiation source 330; and deriving properties of the at least one distinct light or radiation source, based on the at least one identified silhouette, and further based on data derived from the database 340.

According to some embodiments of the present invention, the distinct light or radiation source is defined as a non-ambient light source.

According to some embodiments of the present invention, the deriving of the properties of the at least one distinct light or radiation source comprises mapping the scene into a map of likelihood and confidence as to the presence and properties of the at least one distinct light or radiation source.

According to some embodiments of the present invention, the deriving of the light source properties is achieved by backtracking the rays of light or radiation from outlines of the at least one candidate silhouette 12, based on boundaries of the objects in the scene as derived from the database 120.

According to some embodiments of the present invention, the method further includes a step of calculating silhouettes based on the derived properties of the at least one distinct light or radiation source and checking presence of real silhouettes wherein the calculated silhouettes are located, for validating the derived properties of the at least one distinct light source.

According to some embodiments of the present invention, the method further includes a step of updating the properties of the at least one distinct light or radiation source, based on a difference between the location of the calculated silhouettes and the properties of the validated silhouettes such as shape, color (bandwidth), location, and the like.

According to some embodiments of the present invention, the method further includes a step of detecting regions in the scene that are free from silhouettes, and calculating, based on data derived from the database, where distinct light or radiation source cannot be located.

According to some embodiments of the present invention, the method further includes a step of obtaining an ambient light or radiation level in the scene and normalizing the derived properties of the at least one distinct light or radiation source based on the ambient light or radiation level.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that, where the claims or specification refer to "a" or "an" element, such reference is not be construed that there is only one of that element.

It is to be understood that, where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method comprising:
sensing at least one image of a scene containing surfaces and objects, wherein the scene is illuminated by at least one distinct radiation source;
maintaining a database of the scene which stores approximate positions of at least portions of at least some of the objects in the scene;
identifying at least one candidate silhouette, in the at least one image sensed by a sensing device, that is suspected to be cast by the at least one distinct radiation source; and
deriving properties of the at least one distinct radiation source, based on the at least one identified silhouette, based on data derived from the database.

2. The method according to claim 1, wherein a distinct radiation source is defined as a non-ambient radiation source.

3. The method according to claim 1, wherein the deriving of the properties of the at least one distinct radiation source comprises mapping the scene into a map of likelihood and confidence as to the presence and properties of the at least one distinct radiation source.

4. The method according to claim 1, wherein the deriving of the radiation source properties is achieved by backtracking the radiation lines from outlines of the at least one candidate silhouette, based on boundaries of the objects in the scene as derived from the database.

5. The method according to claim 1, further comprising calculating silhouettes based on the derived properties of the at least one distinct light source and checking presence of real silhouettes wherein the calculated silhouettes are located, for validating the derived properties of the at least one distinct radiation source.

6. The method according to claim 5, further comprising updating the properties of the at least one distinct radiation source, based on a difference between the properties of the calculated silhouettes and the properties of the validated silhouettes.

7. The method according to claim 1, further comprising detecting regions in the scene that are free from silhouettes, and calculating, based on data derived from the database, where distinct light or radiation source cannot be located.

8. The method according to claim 1, further comprising obtaining an ambient radiation level in the scene and normalizing the derived properties of the at least one distinct radiation source based on the ambient radiation level.

9. The method according to claim 1, further comprising obtaining information regarding at least one reflective surface located in the scene, and wherein said deriving properties of the at least one distinct radiation source, is further based on at least one identified silhouette known to be cast by reflections of the at least one distinct radiation source reflected by said at least one reflective surface.

10. A system comprising:
a sensing device configured to sense at least one image of a scene containing surfaces and objects, wherein the scene is illuminated by at least one radiation source;
a database of the scene configured to store approximate positions of at least portions of at least some of the objects in the scene; and
a computer processor configured to:
identify at least one candidate silhouette, in the at least one image sensed by the sensing device, that is suspected to be cast by at least one object, and
derive at least some properties of the at least one radiation source, based on the at least one identified silhouette and the at least one corresponding object.

11. The system according to claim 10, wherein a distinct radiation source is defined as a non-ambient radiation source.

12. The system according to claim 10, wherein the deriving of the properties of the at least one distinct radiation source comprises mapping the scene into a map of likelihood and confidence as to the presence and properties of the at least one distinct radiation source.

13. The system according to claim 10, wherein the deriving of the radiation source properties is achieved by backtracking the rays of radiation from outlines of the at least one candidate silhouette, based on boundaries of the objects in the scene as derived from the database.

14. The system according to claim 10, further comprising calculating silhouettes based on the derived properties of the at least one distinct radiation source and checking presence of real silhouettes wherein the calculated silhouettes are located, for validating the derived properties of the at least one distinct radiation source.

15. The system according to claim 14, further comprising updating the properties of the at least one distinct radiation source, based on a difference between the properties of the calculated silhouettes and the properties of the validated silhouettes.

16. The system according to claim 10, further comprising detecting regions in the scene that are free from silhouettes, and calculating, based on data derived from the database, where distinct radiation source cannot be located.

17. The system according to claim 10, further comprising obtaining an ambient radiation level in the scene and normalizing the derived properties of the at least one distinct radiation source based on the ambient radiation level.

18. The system according to claim 10, wherein the computer processor is further configured to obtain information regarding at least one reflective surface located in the scene, wherein said deriving properties of the at least one distinct radiation source, is further based on at least one identified silhouette known to be cast by reflections of the at least one distinct radiation source reflected by said at least one reflective surface.

* * * * *